US005686504A

United States Patent [19]

Ang

[11] Patent Number: 5,686,504
[45] Date of Patent: Nov. 11, 1997

[54] PIGMENTED, UV-CURED, ACRYLIC-BASED, PRESSURE SENSITIVE ADHESIVES, AND METHOD FOR MAKING SAME

[75] Inventor: T. Liem Ang, South Pasadena, Calif.

[73] Assignee: Avery Dennison Corporation, Pasadena, Calif.

[21] Appl. No.: 752,432

[22] Filed: Nov. 19, 1996

Related U.S. Application Data

[63] Continuation of Ser. No. 438,517, May 10, 1995, abandoned.

[51] Int. Cl.$^6$ ................................................. C08F 2/46
[52] U.S. Cl. ............................ 522/46; 522/53; 522/55; 522/64; 522/81
[58] Field of Search ........................... 522/46, 53, 55, 522/64, 81

[56] References Cited

U.S. PATENT DOCUMENTS

| | | | |
|---|---|---|---|
| 2,956,904 | 10/1960 | Hendricks | 117/93 |
| 3,328,194 | 6/1967 | Kasper | 117/62 |
| 3,565,779 | 2/1971 | Luders et al. | 204/159.14 |
| 3,632,493 | 1/1972 | Rogers, Jr. | 204/159.14 |
| 3,759,807 | 9/1973 | Osborn et al. | 204/159.23 |
| 3,925,282 | 12/1975 | Davis et al. | 260/23 |
| 3,926,641 | 12/1975 | Rosen | 96/115 |
| 4,038,164 | 7/1977 | Via | 204/159.15 |
| 4,052,527 | 10/1977 | Pastor et al. | 428/463 |
| 4,070,262 | 1/1978 | Guarino et al. | 204/159.24 |
| 4,071,425 | 1/1978 | Guarino et al. | 204/159.24 |
| 4,072,592 | 2/1978 | Due et al. | 204/159.15 |
| 4,077,859 | 3/1978 | Costanza et al. | 204/159.23 |
| 4,144,157 | 3/1979 | Guse et al. | 204/159.23 |
| 4,181,752 | 1/1980 | Martens et al. | 427/54.1 |
| 4,188,223 | 2/1980 | Woodbrey et al. | 430/270 |
| 4,234,674 | 11/1980 | Woodbrey et al. | 430/253 |
| 4,281,152 | 7/1981 | Huemmer et al. | 560/52 |
| 4,354,008 | 10/1982 | Skoultchi | 525/370 |
| 4,364,972 | 12/1982 | Moon | 427/54.1 |
| 4,379,201 | 4/1983 | Heilmann et al. | 428/345 |
| 4,522,913 | 6/1985 | Kanno et al. | 430/285 |
| 4,574,130 | 3/1986 | Potter et al. | 523/111 |
| 4,672,079 | 6/1987 | Li Bassi et al. | 522/35 |
| 4,714,655 | 12/1987 | Bordoloi et al. | 428/345 |
| 4,737,559 | 4/1988 | Kellen et al. | 526/291 |
| 4,814,215 | 3/1989 | Lautenschlaeger et al. | 428/40 |
| 4,914,004 | 4/1990 | Köhler et al. | 430/272 |
| 5,028,484 | 7/1991 | Martin et al. | 428/352 |
| 5,128,386 | 7/1992 | Rehmer et al. | 522/35 |
| 5,180,756 | 1/1993 | Rehmer et al. | 522/35 |
| 5,194,455 | 3/1993 | Massow et al. | 522/152 |
| 5,264,533 | 11/1993 | Rehmer et al. | 526/301 |
| 5,278,271 | 1/1994 | Miyajima et al. | 526/307 |

FOREIGN PATENT DOCUMENTS

| | | |
|---|---|---|
| 0246848 | 11/1987 | European Pat. Off. . |
| 0373662 | 6/1990 | European Pat. Off. . |
| 2743979 | 6/1980 | Germany . |
| 3512179 | 4/1986 | Germany . |
| 3534645 | 2/1987 | Germany . |

OTHER PUBLICATIONS

S. Pappas and V.D. McGinnis, *UV Curing: Science and Technology*, Ch. 1 (1980).

Kinstle and Waston, Jr., Journal of Radiation Curing, Apr. 1975, pp. 7–12.

G. Auchter, J. Barwich, G. Rehmer and H. Jager, "Developing UV–crosslinkable Acrylic Hot Melt PSAs," *Adhesive Age*, Jul. 1994, pp. 20–25.

G. Auchter, J. Barwich, H. Jager and G. Rehmer, "UV–crosslinkable Acrylic Hot Melt Pressure–Sensitive Adhesives," Reprinted from *Adhaesion*, vol. 37, No. 1–2, 1993.

G.K. Noren et al., *Radiation Curing of Polymeric Materials*, Chapter 12, American Chemical Society, 1990, pp. 151–159.

John P. Guarino et al., *Low Odor UV Cure Coatings*, Journal of Radiation Curing, Jul. 1988 pp. 2–10.

*Primary Examiner*—Mark Chapman
*Attorney, Agent, or Firm*—Christie, Parker & Hale, LLP

[57] ABSTRACT

Pressure sensitive adhesives that cure to a high cohesive strength at room and elevated temperatures, and a method for making such adhesives, are provided. The adhesives comprise an acrylic copolymer compounded with a pigment and a hydrogen-abstracting photoinitiator. A tackifier and/or multifunctional acrylate or methacrylate can also be added. The acrylic copolymer is prepared from a substantially acid-free monomer mixture of at least one alkyl acrylate and a tertiary amine-containing monomer, such as DMAPMA. Other monomers, including polar vinylic monomers and diesters of ethylenically unsaturated dicarboxylic acids are, preferably, also included. Despite the presence of titanium dioxide or other pigments, the compounded copolymers are UV-cured to a high cohesive strength through the combination of tertiary amine functional groups and hydrogen-abstracting photoinitiators, which form synergistic pairs when irradiated, leading to free radical formation and polymer cross-linking. Unpigmented adhesives are also provided.

44 Claims, 3 Drawing Sheets

PIGMENTED, UV-CURED, ACRYLIC-BASED, PRESSURE SENSITIVE ADHESIVES, AND METHOD FOR MAKING SAME

CROSS-REFERENCE TO RELATED APPLICATION

This is a continuation of application Ser. No. 08/438,517, filed May 10, 1995 now abandoned.

BACKGROUND OF THE INVENTION

The present invention relates to pigmented, UV-crosslinked, acrylic-based, pressure sensitive adhesives having high cohesive strength and high-temperature shear resistance, and methods for making such adhesives.

High performance pressure sensitive adhesives (PSA's) are normally characterized by the ability of the adhesive to withstand creep or shear deformation at high loadings and/or high temperatures, while exhibiting adequate tack and peel adhesion properties. This balance of properties is derived from the structure of the main polymer bulk which makes up the PSA. It is characterized by a high molecular weight, which provides the necessary cohesive strength and resistance to shear deformation, and by a low modulus of the polymer backbone, which allows the polymer to conform to a substrate surface upon contact. Certain surface energy and polarity requirements must also be satisfied for a good bond to form between adhesive and substrate.

High molecular weight, or the physical effect of a high molecular weight, can be obtained by primary polymerization of monomers to form a backbone of long chain length and/or by creating a high degree of interchain hydrogen bonding, ionic association, or covalent crosslinking between polymer chains. For example, U.S. Pat. No. 4,181,752 (Martens et al.) describes the manufacture of crosslinked acrylic polymers using "on web" polymerization of a polymer-monomer "syrup," which is coated on a moving web substrate and irradiated with UV light. To form polymers having sufficiently high molecular weight, the UV radiation is supplied at low intensities, e.g., 0.001 to 0.070 kWatts/m$^2$, while advancing the web at slow speeds, e.g., 2 in./min. to 2 ft./min. Irradiation preferably is carried out in the absence of air or oxygen, so provisions have to be made for inerting the UV curing system.

One approach to crosslinking polymers by UV radiation is to incorporate UV-responsive functional groups in the polymer backbone. When irradiated, these functional groups form free radicals on the polymer and are the starting points for crosslinking and network formation. The UV-responsive functional groups are incorporated into the polymer by copolymerizing photoinitiators with the other monomers which make up the polymer molecules. Several examples of this approach are known.

U.S. Pat. No. 4,281,152 (Huemmer and Lakshmanan) describes the synthesis of benzophenone derivatives which are copolymerizable into a polymer backbone by way of acrylic functional groups. The benzophenone derivatives are claimed to be useful as a component of UV curable resin compositions and of anaerobic thermosetting adhesive compositions.

European Patent Application No. 87 304396.2 (Kellen and Taylor) describes the synthesis and use of benzophenone and acetophenone derivatives which are copolymerizable into a polymer backbone via acrylic or acrylamide functional groups. The derivatives are said to be useful in adhesive compositions that make contact with human skin. A PSA which is a copolymer of acrylic monomers and the ketone derivative, and which can be UV crosslinked through the ketone moieties, is described. The amount of crosslinking ketone comonomer and the degree of polymerization of the copolymer are controlled to obtain the right creep compliance value for an enhanced level of initial adhesion when applied to the skin, while resisting objectionable adhesion build-up over time.

German Offenlegungsschrift Nos. DE 35 12179 and DE 35 34645 (Koehler et al.) describe a route to convert Darocur 1173 and similar acyloin compounds into copolymerizable acrylated or methacrylated derivatives. Darocur 1173 is phenyl-(2-hydroxy-2-propyl) ketone, a well known photoinitiator formerly sold by the E. Merck Company, now available from Ciba. The functionalized Darocur 1173 is 4-(2-acryloyloxy-ethoxy)phenyl-(2-hydroxy-2-propyl) ketone, which is available in experimental research quantities from Ciba. The use of these copolymerizable photoinitiators in coatings and inks is claimed to give totally odor free products after UV curing, because of the absence of volatile photoinitiation byproducts. A marketing publication describes the usefulness of these copolymerizable photoinitiators in UV cured, hard coating compositions.

An article by J. P. Guarino and J. P. Ravijst, of Radcure Specialties, published in the Journal of Radiation Curing of July 1988, pp. 2–10, describes the use of copolymerizable photoinitiators in coating compositions which emit very low levels of odor upon UV curing. Radcure Specialties markets an acrylated benzophenone, Uvecryl P-36, which is used in combination with an amine co-initiator and is said to give UV curable coatings having minimal odor.

U.S. Pat. No. 4,052,527 (Pastor and M. M. Skoultchi) claims a method of production of UV crosslinkable hot melt PSA materials. The polymers, which are made in methanol solution, are essentially acrylic in nature and contain modifying monomers such as vinyls. The solvent is vacuum stripped, so that the polymer can be coated as a hot melt between 120° and 180° C. No additional multifunctional acrylates, such as HDODA, are added for UV crosslinking. The polymers are UV crosslinkable to a good balance of peel adhesion and high cohesive strength, because of copolymerizable photoinitiators, e.g., 3-(chlorinated aryloxy)-2-hydroxypropyl acrylates and methacrylates, in the adhesive.

U.S. Pat. No. 4,144,157 (Guse et al.) (from DE 24 43 414) describes PSA materials that are readily UV crosslinkable to high holding powers via copolymerized photoinitiators which belong to a class of (2-alkoxy-2-phenyl-2-benzoyl) ethyl acrylates or methacrylates. The polymers, while not containing ethylenic unsaturation, are said to UV-crosslink without needing additional multifunctional acrylates.

German Auslegeschrift No. DE 27 43 979 (also to Guse et al.) claims a method for making UV crosslinkable acrylic PSA materials by copolymerizing benzoin acrylate or benzoin methacrylate photoinitiators in the polymer backbone. The adhesives are made in and coated out of solution and, while not containing ethylenic unsaturation, do not require additional multifunctional acrylates for UV crosslinking.

U.S. Pat. No. 4,672,079 (LiBassi et al.) describes a new class of aromatic-aliphatic ketone photoinitiators, and the use of such compounds in the photopolymerization of ethylenically unsaturated monomer or oligomer mixtures. The mixtures are used in wood paints, paper lacquers, printing inks, inks and lacquers for engraving printed and integrated circuits, solutions for fabric printing, etc.

U.S. Pat. Nos. 5,128,386, 5,180,756, and 5,264,533 (all to Rehmer et al.) describe UV crosslinkable materials based on (meth)acrylate copolymers containing highly derivatized benzophenone, acetophenone, and similar photoinitiators as polymerized units. For example, U.S. Pat. No. 5,128,386 describes UV crosslinkable materials containing copolymerized benzophenone and acetophenone derivatives which dangle from the acrylic polymer backbone by long (up to several hundred atoms or more) spacer groups. The copolymerized photoinitiator groups provide UV activatable crosslinking sites. Preferably, the copolymers also contain α,β-mono-olefinically unsaturated mono- and/or dicarboxylic acid or amide monomers (e.g., acrylic acid, methacrylic acid, etc.), and may also contain additional comonomers, such as olefinically unsaturated tertiary amino compounds, the function of which is not defined. A long list of such olefinically unsaturated tertiary amino compounds is provided, but no examples of adhesives prepared from such monomers are provided. The UV crosslinkable materials are said to be useful as hot melt adhesives for coating mineral substrates, and as surface coatings.

Similarly, U.S. Pat. No. 5,180,756 describes UV-curable agents based on a binder formulation of a copolymer and mono- and polyolefinically unsaturated compounds. The copolymer is prepared by polymerizing a mixture of olefinically unsaturated monomers (e.g., (meth)acrylates, vinylesters of saturated carboxylic acids, etc.) and a copolymerizable olefinically unsaturated photoinitiator (e.g., copolymerizable benzophenone derivatives, acetophenone derivatives, etc.). As in the '386 patent, the copolymers may also contain α, β-monolefinically unsaturated acids, N-substituted amides, and other groups as polymerized units, including, for example, polymerized monomers having basic N atoms such as N,N-diethyl (or dimethyl) aminoethyl(meth)acrylate. The materials are said to be useful as contact adhesives.

U.S. Pat. No. 5,264,533 describes UV-crosslinkable materials based on (meth)acrylate copolymers containing modified unsaturated benzophenone, acetophenone, and similar ketone derivatives, as copolymerized units. The copolymers contain, as principal monomers, alkyl acrylates and/or methacrylates, and, preferably, also include α,β-mono-olefinically unsaturated mono- and/or dicarboxylic acids or amides as copolymerized units, and may also include olefinically unsaturated tertiary amino compounds. A long list of such compounds is provided, but no examples using such monomers are presented.

Each of the last three mentioned patents was assigned to BASF and, in fact, BASF sells a 100% solids, acrylic-based, clear, pressure sensitive adhesive under the name "Acronal DS 3429S," which it describes as being UV-crosslinkable by means of copolymerized benzophenone derivatives in the polymer makeup. It is believed that Acronal DS 3429S is made according to one or more of the aforementioned Rehmer et al. patents.

Although many of the patents listed above describe UV-crosslinked materials where crosslinkability is accomplished by incorporating copolymerizable photoinitiators into the polymer backbone, in fact, very few copolymerizable photoinitiators are commercially available. Applicant is aware of only two: Uvecryl P-36 (an acrylated benzophenone from Radcure Specialties), and acryloxyethoxylated Darocur 1173 (available in experimental quantities from Ciba). The future of the latter compound is uncertain. Upon irradiation by UV light, both photoinitiators generate free radical fragments on the polymer backbone and provide a way to facile crosslinking with other polymer chains, eventually leading to the formation of a network, i.e., gel. In pressure sensitive adhesives, such a gel is normally associated with a high cohesive strength, high temperature shear strength and high solvent resistance.

Unfortunately, Uvecryl P-36 and acryloxyethoxylated Darocur 1173 absorb UV energy at shorter wavelengths of the UV spectrum. This is the region of the electromagnetic spectrum where pigments such as titanium dioxide are strong UV absorbers and interfere with photoinitiator activation. Consequently, such photoinitiators are unsuitable for applications where the adhesive to be cured is highly pigmented with titanium dioxide or similar inorganic materials. What is needed is a mechanism for crosslinking pigmented, pressure sensitive adhesives that is not compromised by the presence of titanium dioxide or other pigments.

A second type of photoinitiator chemistry is known. Specifically, some photoinitiators, when irradiated with UV light, do not break up into free radicals, but become excited to a higher energy state in which they can abstract a hydrogen atom from a donor molecule, thereby generating on the donor molecule a free radical capable of further reaction, such as free radical addition polymerization, free radical addition crosslinking, etc. Amines are known to serve as synergists in this process, particularly with hydrogen-abstracting photoinitiators such as acetophenone, benzophenone, thioxanthone, benzil, quinone, and their derivatives. See generally, S. Pappas and V. D. McGinniss, *UV Curing: Science and Technology*," Chapter 1 (1980).

U.S. Pat. No. 3,759,807 (Osborn et al.) describes the photopolymerization of (meth)acrylic compounds by irradiating with UV light in the presence of an organic carbonyl photoinitiator (i.e., acetophenone, benzophenone, xanthone, thioxanthone, and similar compounds and derivatives thereof), and an organic amine. The presence of both the carbonyl photoinitiator and the organic amine speeds up the polymerization reaction.

Kinstle and Watson, Jr., in the *Journal of Radiation Curing*, 2, (2), 7 (1975), describe the use of amine-assisted photoinitiators in the grafting of poly-2-ethylhexylmethacrylate branches onto polystyrene molecules. The polystyrene contained N,N-diethylamino groups along its backbone. Upon irradiation with UV light, and in the presence of benzophenone and 2-ethylhexylmethacrylate monomer, the amine-containing polystyrene generated free radicals at the amine functionalities, thereby initiating the graft growth of poly-2-ethylhexylmethacrylate branches.

Noren and Murphy, in *Radiation Curing of Polymeric Materials*, 417, ch. 12, pp. 151–159 (1990), describe the use of polymer bound amine synergists for UV-cure of non-acrylate unsaturated resins initiated by hydrogen abstraction photoinitiators such as benzophenone. Good cure was obtained with methyl or ethyl substituted tertiary amines and high functionality unsaturated resins. Various photoinitiators were evaluated using a tertiary amine pendent acrylic copolymer synthesized from a mixture of methyl methacrylate, 2-ethylhexyl acrylate, hydroxypropyl acrylate, dimethylaminoethyl methacrylate, and AIBN. The use of such systems in PSA's is not disclosed.

U.S. Pat. No. 5,194,455 (Massow et al.) describes a method for preparing acrylate-based, hot melt, PSA's characterized in that an acrylic monomer (and, optionally, one or more other ethylenically unsaturated compound(s)) is copolymerized with N-tert-butylacrylamide TBA; a photosensitizer (e.g., IRGACURE®, DAROCUR®, etc.) is optionally added; the solid polymer is heated and applied to a substrate; and the coated substrate is irradiated with high energy radiation (alpha, beta, gamma, x-rays, or UV). The resulting adhesive is said to have a high shear strength, including at high temperatures. Increased crosslinking by radiation is said to result from the presence of TBA in the PSA polymer, but no explanation is provided.

SUMMARY OF THE INVENTION

The present invention provides pigmented, crosslinked, acrylic-based, pressure sensitive adhesives that exhibit high cohesive strength and high-temperature shear resistance, and a method for making such adhesives. Despite the presence of titanium dioxide in some embodiments of the invention, the adhesive formulations are readily UV-crosslinked to a high cohesive strength as a result of (a) tertiary amine groups incorporated into the backbone of the adhesive copolymer, and (b) hydrogen-abstracting photoinitiators used to compound the copolymer. In combination, the tertiary amines and hydrogen-abstracting photoinitiators act synergistically, and facilitate free radical formation within the polymer backbone when irradiated with UV light. By using photoinitiators that absorb in the near UV region of the electromagnetic spectrum, even PSA's containing strongly light scattering pigments, such as titanium dioxide, are readily UV-crosslinked.

In one embodiment of the invention, a pigmented, crosslinked, pressure sensitive adhesive is prepared as follows: First, an acrylic-based copolymer is prepared by polymerizing a substantially acid-free monomer mixture comprising at least one alkyl acrylate and a tertiary amine-containing monomer. Preferably, additional monomers are also present in the mixture, including at least one polar vinylic monomer and at least one diester of an ethylenically unsaturated dicarboxylic acid. The copolymer is then compounded with an opaque pigment, such as titanium dioxide, and a hydrogen-abstracting photoinitiator. In some embodiments, a tackifier and a multifunctional acrylate or methacrylate are also added. The compounded copolymer is applied to a substrate and irradiated with UV light, which causes free radicals to form within the backbone of the polymer, resulting in facile adhesive network formation and an adhesive having high cohesive strength and high temperature shear resistance.

The method of the present invention is also useful for manufacturing unpigmented pressure sensitive adhesives. When the adhesive is unpigmented, photoinitiators which absorb at shorter UV wavelengths can be used, as interference from the pigment is not a concern.

Pressure sensitive adhesive constructions prepared in accordance with the present invention are characterized by high cohesive strength at room and elevated temperatures, and are suitable for a wide variety of applications, including preparation of label constructions. The adhesives exhibit good solvent resistance (including good resistance to isopropylalcohol, often used as a rinsing agent for pharmaceutical containers). When tackified with a hydrocarbon resin, rosin ester resin, or similar tackifier, the adhesives exhibit good mandrel performance.

BRIEF DESCRIPTION OF THE DRAWINGS

These and other features and advantages of the present invention will be better understood when the following detailed description is considered in conjunction with the accompanying drawings, wherein.

DETAILED DESCRIPTION

The present invention provides a crosslinked, pigmented, pressure sensitive adhesive construction characterized by high cohesive strength at room and elevated temperatures. The adhesive construction is conveniently prepared by polymerizing a substantially acid-free monomer mixture comprising at least one alkyl acrylate and a tertiary amine-containing monomer; compounding the copolymer with an opaque pigment (such as titanium dioxide) and a hydrogen-abstracting photoinitiator; applying the compounded copolymer to a substrate; and irradiating the adhesive-coated substrate with ultraviolet (UV) light. Optionally, the copolymer is also compounded with a multifunctional acrylate or a methacrylate and/or a tackifier, prior to irradiation.

Despite the presence of opaque pigments, the pressure sensitive adhesive cures to a high cohesive strength as a result of interaction between the hydrogen-abstracting photoinitiator and a tertiary amine functionality within the backbone of the copolymer.

In one embodiment of the invention, the acrylic-based copolymer comprises, based on the total weight of monomers: (i) from about 30 to about 99.9% by weight of at least one alkyl acrylate or a mixture of alkyl acrylate and alklymethacrylate monomers; (ii) from about 0.01 to about 15% by weight of a tertiary amine-containing monomer; (iii) from 0 to about 25% by weight of at least one polar vinylic monomer; and (iv) from 0 to about 30% by weight of at least one diester of an ethylenically unsaturated dicarboxylic acid.

The alkyl acrylate monomers (or mixture of alkyl acrylate and alkyl methacrylate monomers) help lower the modulus of the copolymer prepared therefrom, and generally comprise the bulk of the acrylic copolymer, i.e., up to about 99.99% by weight, though in some embodiments they comprise as little as 30% by weight of the total monomers. More preferably, the alkyl acrylate (or alkyl acrylate and alkyl methacrylate monomers) are present in an amount of from about 50 to about 70% by weight, based on the total weight of all monomers.

The alkyl acrylates and alkyl methacrylates used in the present invention have straight chain alkyl groups, branched chain alkyl groups, or cyclic alkyl groups and, preferably, contain from 1 to about 24 carbon atoms. More preferably, the alkyl group contains from 1 to about 12 carbon atoms. Alkyl acrylates and methacrylates having longer alkyl groups tend to be more expensive and generally are not sold as commodity chemicals. In addition, alkyl acrylates and methacrylates having more than about 24 carbon atoms in the alkyl group tend to yield copolymers which are wax-like and have diminished adhesive properties, including reduced tack. Useful pressure sensitive adhesive constructions can be prepared in accordance with the present invention, however, using such long chain alkyl acrylates as stearylacrylate, which has an alkyl group with from about 14 to 18 carbon atoms. In general, when longer chain (between 12 and 24 carbon atoms) alkyl acrylates or methacrylates are used, they comprise a relatively small fraction of the total monomers used to prepare the copolymer.

In a preferred embodiment, the alkyl acrylate or alkyl methacrylate monomers have from about 4 to about 8 carbon atoms. Such monomers are generally commercially available as commodity chemicals and are less expensive than longer chain alkyl acrylates and methacrylates. They also tend to yield copolymers having a good balance of tack and peel.

A representative, but nonlimiting list of alkyl acrylates and alkyl methacrylates useful in the practice of the present invention includes methyl acrylate, ethyl acrylate, n-propyl acrylate, isopropyl acrylate, n-butyl acrylate, isobutyl acrylate, n-amyl acrylate, isoamyl acrylate, n-hexyl acrylate, isohexyl acrylate, cyclohexyl acrylate, isooctyl acrylate, 2-ethylhexyl acrylate, decyl acrylate, lauryl acrylate, stearyl acrylate, isobornyl acrylate, and mixtures thereof, as well as the analogous methacrylate monomers. It will be appreciated, however, that alkyl methacrylates generally yield copolymers having higher $T_g$'s than their alkyl acrylate counterparts. Therefore, when alkyl methacrylates are used, they are employed in small quantities only. As a general rule of thumb, the alkyl methacrylates comprise no more than about 15% of the total weight of all monomers.

The tertiary amine-containing monomer is a polymerizable compound containing at least one tertiary amine functional group that has one or more hydrogen atoms on a carbon $\alpha$ to the nitrogen. As discussed below, the tertiary amine group acts synergistically with hydrogen-abstracting photoinitiators, and provides a site for free radical generation, polymer crosslinking, and facile adhesive network formation. Good results are obtained with amine-containing monomer concentrations as low as about 0.01% by weight, though concentrations of between about 1 to 6% by weight are preferred.

Useful tertiary amine-containing monomers include acrylic, methacrylic, acrylamide, methacrylamide, styrenic, and vinylic monomers containing at least one tertiary amine functional group, and similar compounds. A representative, but non-exclusive list of such tertiary amine-containing monomers includes:

N,N-dimethylaminopropyl methacrylamide (DMAPMA),
N,N-diethylaminopropyl methacrylamide (DEAPMA)
N,N-dimethylaminoethyl acrylate (DMAEA),
N,N-diethylaminoethyl acrylate (DEAEA),
N,N-dimethylaminopropyl acrylate (DMAPA),
N,N-diethylaminopropyl acrylate (DEAPA),
N,N-dimethylaminoethyl methacrylate (DMAEMA),
N,N-diethylaminoethyl methacrylate (DEAEMA),
N,N-dimethylaminoethyl acrylamide (DMAEAAm),
N,N-dimethylaminoethyl methacrylamide (DMAEMAAm),
N,N-diethylaminoethyl acrylamide (DEAEAAm),
N,N-diethylaminoethyl methacrylamide (DEAEMAm),
4-(N,N-dimethylamino)-styrene (DMAS),
4-(N,N-diethylamino)-styrene (DEAS),
N,N-dimethylaminoethyl vinyl ether (DMAEVE), and
N,N-diethylaminoethyl vinyl ether (DEAEVE).

A tertiary amine-containing monomer used in many of the examples of the invention, described below, is DMAPMA, available from Rohm Tech, Inc., of Malden, Mass. Other tertiary amines, such as DMAEA, DMAEMA, DEAEA, and DEAEMA, are available in production quantities from Rohm Tech, Inc., CPS Chemical Co., Inc., of Old Bridge, N.J., and/or Rohm & Haas, of Philadelphia, Pa. Still other tertiary amines are available in small quantities from specialty chemicals supply houses, such as Aldrich.

It has been discovered that the tertiary amine group should be present in its free amine state, rather than in a protonated state, in order to be responsive to photoactivation. Consequently, it is important that the monomer mixture be essentially acid-free, and not include monomers such as acrylic acid, methacrylic acid, etc., which have often been used to prepare acrylic-based pressure sensitive adhesives in the past. When such acidic comonomers are included with the monomers used in the present invention, no improvement in shear strength or holding power of the polymers following UV irradiation is observed.

The polar vinylic monomer helps impart a good balance of tack and peel properties to the copolymer. Useful polar vinyl monomers include N-vinylpyrrolidone and other nonacidic, polar monomers such as N-substituted and unsubstituted acrylamides, methacrylamides, acrylonitrile, methacrylonitrile, etheracrylates, and ethermethacrylates. Also useful are hydroxyalkyl acrylates and methacrylates, such as hydroxyethyl (meth)acrylate and hydroxypropyl (meth)acrylate; and glycidyl acrylates and methacrylates. The polar vinyl monomer is present in an amount of from 0 to about 25% by weight, more preferably from about 15 to about 20% by weight.

The diester of an ethylenically unsaturated dicarboxylic acid is a monomer which tends to undergo homopolymerization only with great difficulty, if at all, and is advantageously employed in the synthesis of adhesive polymers prepared by bulk polymerization, where it moderates the strong exotherm of the polymerization reaction. The diester is also useful for imparting softness and improved tack to the resulting adhesive. It is generally included in the monomer mixture in a concentration of from 0 to about 30% by weight, more preferably from about 15 to about 25% by weight. Representative examples include alkylesters of fumaric acid and maleic acid, such as dioctyl fumarate, dibutyl fumarate, dioctyl maleate, and mixtures thereof.

The relative amounts of the various monomers are adjusted to control the glass transition temperature ($T_g$), modulus, polarity, cost, and other properties of the copolymer. Preferably, the copolymer has a glass transition temperature of less than about $-5°$ C.

Polymerization is carried out in a conventional manner, by bulk, solvent, and/or emulsion polymerization techniques. A polymerization initiator is added to the monomer mixture to speed up the polymerization reaction. Useful polymerization initiators include peroxide-type initiators, such as benzoyl peroxide, lauroyl peroxide, dicumyl peroxide, and the like, and azo-type initiators, such as VAZO 64, VAZO 67, etc. The "VAZO" line of photoinitiators is available from DuPont Chemical Co. In general, the polymerization initiator is present in an amount of less than about one part per 100 parts total monomers.

Similarly, in some embodiments, a molecular weight regulator is included with the monomer mixture to control the average polymer chain length. Useful regulators include n-dodecyl mercaptan and similar compounds. When included, the molecular weight regulator is present in an amount of less than about one part per 100 parts total monomers.

The copolymer is compounded with a hydrogen-abstracting photoinitiator and a pigment; that is, the photoinitiator and pigment are added to and mixed with the copolymer prior to application onto a substrate. In some embodiments, the copolymer is further compounded with a tackifier, a multifunctional acrylate or methacrylate, or both a tackifier and multifunctional acrylate or methacrylate. Generally, each of these components is added after polymerization of the monomer mixture. In some embodiments, however, the tackifier is added to the monomer mixture prior to polymerization.

The hydrogen-abstracting photoinitiator is added to the copolymer to facilitate UV crosslinking. Although not bound by theory, it is believed that the photoinitiator, when irradiated with UV light, is excited to a higher energy state and abstracts a hydrogen atom from a tertiary amine functional group on the backbone of the copolymer, thereby generating a free radical that is available for further reaction, such as free radical addition crosslinking with another polymer chain. It is also believed that the abstracted hydrogen atom comes from a carbon located $\alpha$ to the nitrogen in the amine functionality.

A variety of hydrogen-abstracting photoinitiators are known, including benzophenone, acetophenone, thioxanthone, derivatives of these compounds, and similar compounds. Each compound functions as a photoinitiator by absorbing energy within the UV region of the electromagnetic spectrum. Where the copolymer is pigmented with titanium dioxide, or some other pigment having a high hiding power (i.e., strong light scattering and/or absorption properties), it is preferred to use hydrogen-abstracting photoinitiators that are activated by near UV radiation, i.e., at wavelengths closer to the visible region of the electromagnetic spectrum.

Figure 1:
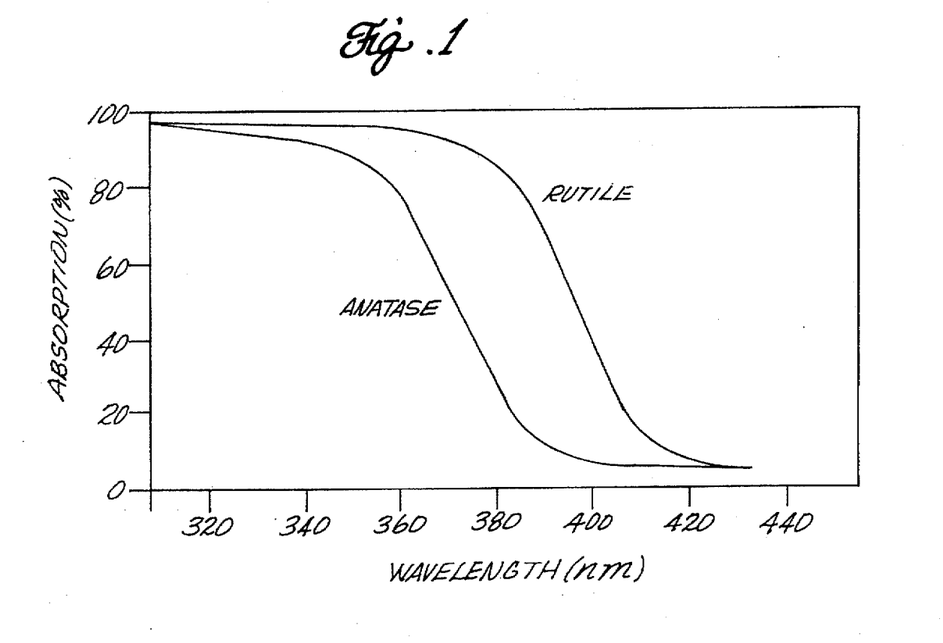
FIG. 1 shows UV absorption spectra for rutile and anatase titanium dioxide.

FIG. 1 shows the UV absorption spectrum for the two common forms of titanium dioxide, rutile and anatase. Rutile is more often used by the coating industry than anatase, because of its higher hiding power. Both pigments are strong UV absorbers, but their absorption drops off within the near UV region of the spectrum at lower pigment loadings. Hence, in those embodiments of the invention where the copolymer is compounded with titanium dioxide or a pigment having similar light scattering or absorption properties, it is preferred to compound the copolymer with a hydrogen-abstracting photoinitiator having one or more medium to strong absorption bands in the near UV region of the electromagnetic magnetic spectrum, i.e., one or more absorption bands at a wavelength longer than about 310 nm.

Several types of hydrogen-abstracting photoinitiators that absorb in the near UV region of the spectrum are known, including acylphosphine oxide-type photoinitiators, redshifted benzophenone-type photoinitiators, and thioxanthone-type photoinitiators.

Commercially available acylphosphine oxide-type photoinitiators include "Lucirin TPO" (2,4,6-trimethylbenzoyldiphenylphosphine oxide), sold by BASF, and "BAPO" (bis[2,6-dimethoxybenzoyl]-2,4-trimethylpentylphosphine oxide), sold by Ciba.

The so-called "redshifted benzophenone-type photoinitiators" are benzophenone derivatives in which one or more hydrogen atoms is replaced by a functional group or groups which cause a redshift (towards longer wavelengths) in the UV absorption spectrum of the molecule, as compared to the UV absorption spectrum of benzophenone. An example is "QUANTACURE BMS" (4-benzoyl-4'-methyldiphenylsulfide), sold by Ward Blenkinsop.

Commercially available thioxanthone-type photoinitiators include "Quantacure ITX," (a mixture of 2-isopropyl- and 4-isopropylthioxanthone isomers, also sold by Ward Blenkinsop.

Figure 2:
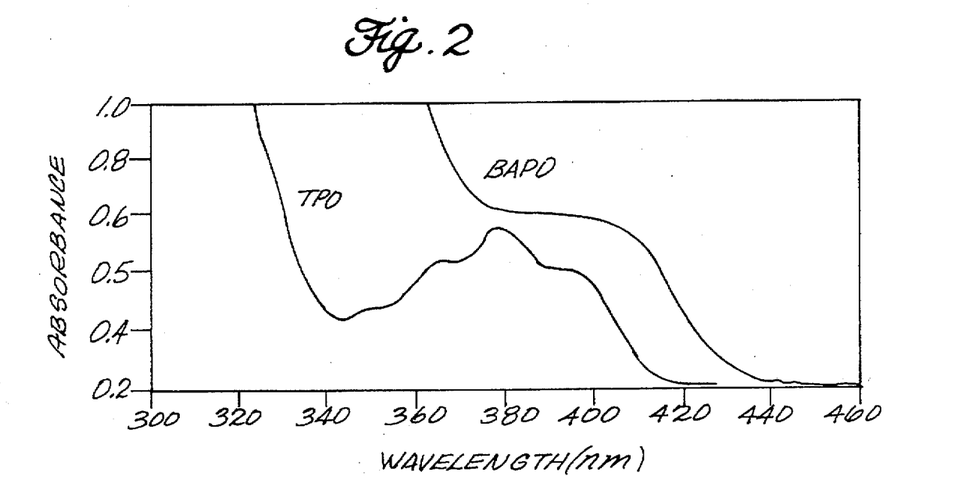
FIG. 2 shows UV absorption spectra for Lucirin TPO and BAPO.
Figure 3:
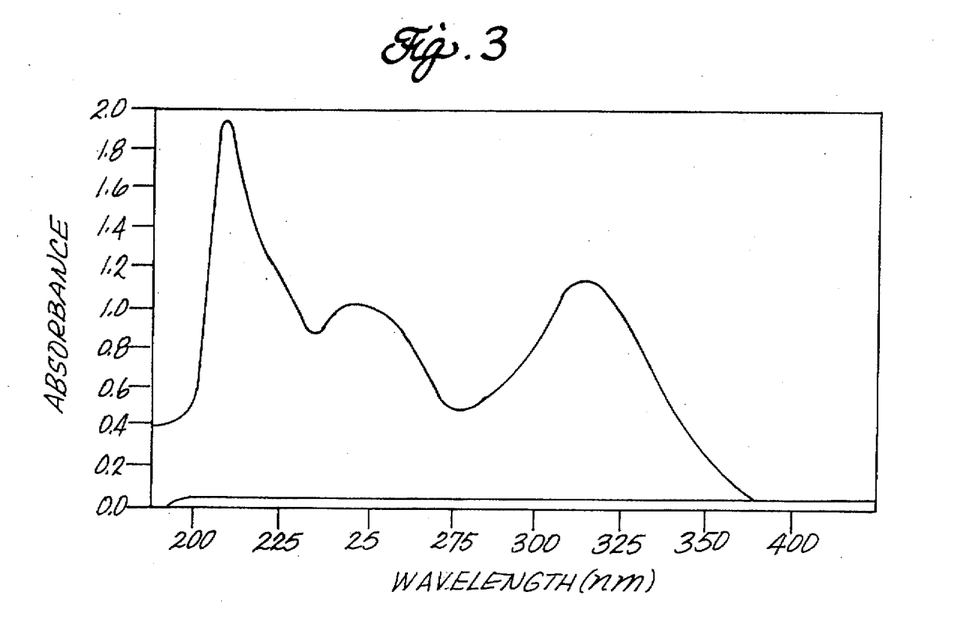
FIG. 3 shows a UV absorption spectrum for QUANTA-CURE BMS.
Figure 4:
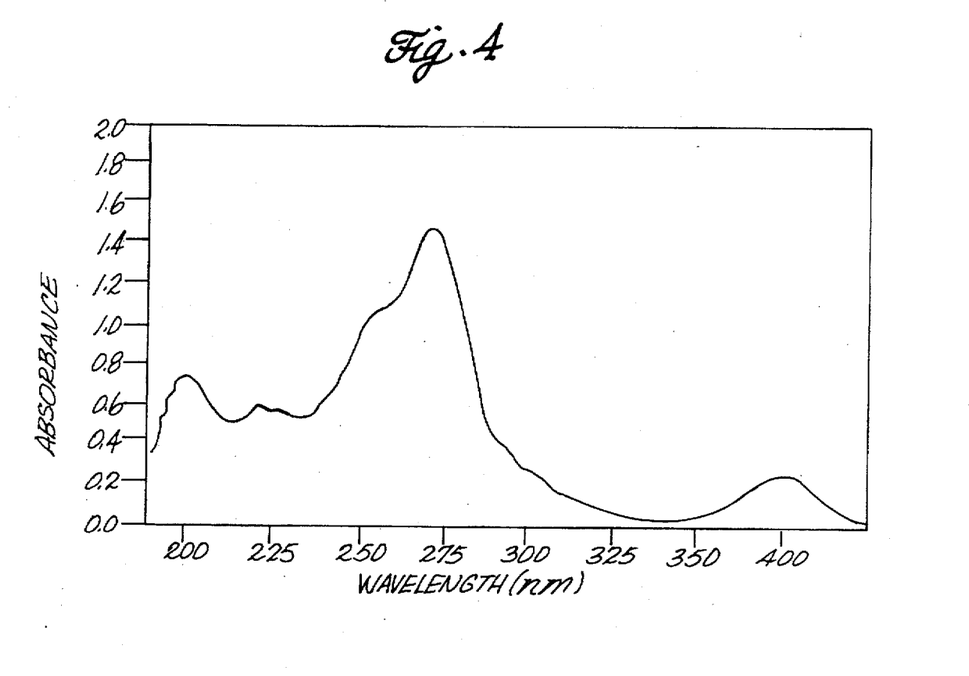
FIG. 4 shows a UV absorption spectrum for QUANTA-CURE ITX.

The UV absorption spectra for Lucirin TPO, BAPO, QUANTACURE BMS, and QUANTACURE ITX are shown in FIGS. 2–4, respectively. As indicated, each of these photoinitiators has one or more medium to strong absorption bands in the near UV region of the electromagnetic spectrum. Other suitable hydrogen-abstracting photoinitiators can be identified by those skilled in the art and utilized in the practice of the invention. Moreover, if the adhesive is compounded without a pigment, hydrogen-abstracting photoinitiators that absorb at shorter UV wavelengths can be employed, including less expensive, simpler photoinitiators such as unsubstituted acetophenone, benzil, benzophenone, quinone, and thioxanthone.

The amount of photoinitiator added to the copolymer depends on several factors, including the amount of pigment added, the amount of multifunctional acrylate or methacrylate (if any) added to the copolymer, the coat weight (thickness) of the copolymer on the substrate, the web speed during curing, and the type and cost of the photoinitiator used. Generally, the photoinitiator is the most expensive ingredient in the compounded copolymer. Therefore, ordinarily it is desirable to minimize the amount of photoinitiator added to the copolymer, so long as enough photoinitiator is included to achieve the desired degree of cure. In one embodiment of the invention, an adhesive construction prepared in accordance with the present invention and containing $TiO_2$ pigment and Lucirin TPO can be cured to a high cohesive strength, in an economically acceptable manner, using about 3 parts Lucirin TPO per hundred parts copolymer. Cost-effective photoinitiator concentrations can also be identified for other hydrogen-abstracting photoinitiators.

In most embodiments of the invention, a pigment is added to the copolymer, prior to the UV cure, in order to render the adhesive opaque, and/or to impart color to the adhesive. Although opaque pigments like titanium dioxide typically are added by the coating industry precisely because of their high hiding power, their presence generally interferes with UV-crosslinking of the adhesive copolymer. In the present invention, however, photoinitiators that absorb in the near UV region of the spectrum are advantageously employed with pigmented (as well as non-pigmented) formulations, thereby avoiding interference with UV cure of the adhesive.

Figure 5:
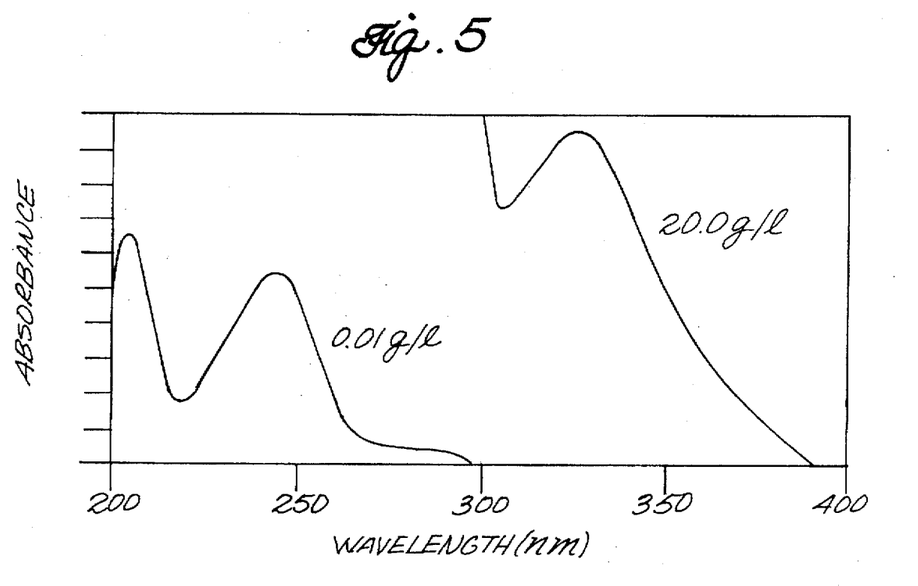
FIG. 5 shows UV absorption spectra for Irgacure 184 at two different concentrations.

The amount of pigment added to the compounded copolymer in a given formulation, like the amount of photoinitiator, depends on a number of factors, including the desired degree of opacity, desired degree of cure, whether other fillers are present, the type and amount of photoinitiator present, and cost considerations. According to Beer's law, the absorption of light at a particular wavelength by a substance is proportional to the product of the concentration of the substance and the thickness of the substance. Consequently, the absorption spectra for pigments and photoinitiators, like that for other substances, can vary depending on the concentration of the substance and its thickness. At low concentration, some absorption bands may not appear in the spectrum, as they will be suppressed (i.e., register such low magnitude at the given sample concentration that they do not appear). An example of this is illustrated in FIG. 5, which depicts UV absorption spectra for Irgacure 184 at two different concentrations. Irgacure 184 is 1-hydroxycyclohexyl phenyl ketone, available from CIBA.

For the present invention, where pigmented, pressure sensitive adhesive constructions are provided, UV-crosslinking can be facilitated by decreasing the amount of titanium dioxide present and/or increasing the amount of photoinitiator. As a practical matter, though, pigment loadings above about 15 parts pigment per hundred parts copolymer (or, if the copolymer is tackified, about 15 parts pigment per 100 parts copolymer plus tackifier) are less preferred than lower pigment loadings. UV-cured, pressure sensitive adhesive constructions having high cohesive strength can be prepared in accordance with the present invention with higher pigment loadings, but require higher (and more expensive) photoinitiator concentrations and/or longer cure times.

Figure 6:
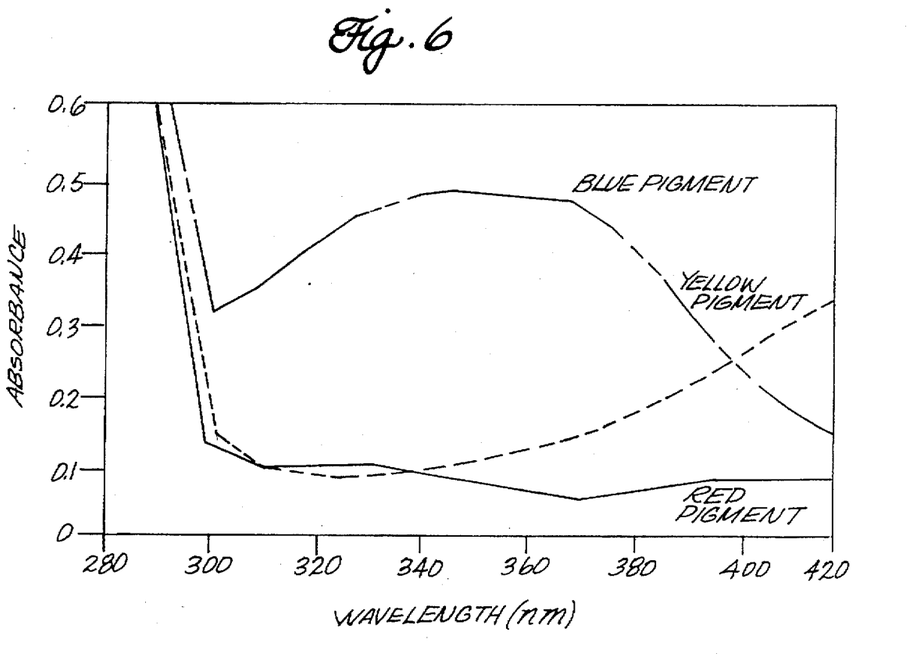
FIG. 6 shows UV absorption spectra for blue, yellow, and red pigments.

In some embodiments of the invention, the adhesive construction is formulated with a colored (non-white) pigment. FIG. 6 shows the UV absorption spectra for blue, yellow, and red pigments commonly used in coatings and inks. As indicated, the pigments absorb at different wavelengths within the UV and visible regions of the spectrum.

Generally, yellow and red pigments do not substantially interfere with photoinitiators that absorb in the UV region. Hence, adhesives compounded with such pigments can be UV-cured to a high cohesive strength by using UV-activatable, hydrogen-abstracting photoinitiators. Blue pigments do tend to absorb strongly in at least part of the near UV region. By minimizing the amount of blue pigment that is added, however, UV crosslinkable adhesives can be prepared in the manner described above.

In addition to the pigment and hydrogen-abstracting photoinitiator, in some embodiments, the copolymer is further compounded with a tackifier (to improve the tack of the pressure sensitive adhesive) and/or a multifunctional acrylate or methacrylate (to increase the amount of crosslinking of the adhesive composition during UV cure).

A variety of tackifiers, well-known in the industry, are useful in the practice of the present invention. Representative, nonlimiting examples include hydrocarbon resins and rosin ester resins. Generally, up to about 45 parts tackifier per hundred parts polymer are added.

Similarly, a variety of multifunctional acrylates and methacrylates are known. Representative, nonlimiting examples include diethylene glycol diacrylate, triethylene glycol diacrylate, tripropylene glycol diacrylate, 1,6-hexanediol diacrylate, trimethylolpropane triacrylate, trimethylolpropane trimethacrylate, pentaerythritol-triacrylate, and mixtures thereof. When added to the copolymer, the multifunctional acrylate or methacrylate is present in an amount of up to about 15 parts per hundred parts of copolymer.

The compounded copolymer is applied to a substrate, such as a paper, plastic sheet, film or foil, or similar web material in a conventional manner, as a hot melt, solution, or emulsion adhesive. A particularly convenient mode of application is direct coating, wherein thecompound copolymer is directly applied to a moving web substrate as a thin film. When solution adhesives or emulsion adhesives are used, the major portion of low volatiles is removed before the coated material is cured, preferably by placing it in a forced air oven for a few minutes. The last traces of low volatiles can then be removed in a forced air oven after cure.

After the adhesive is coated on a substrate at a desired coat weight, the coated substrate is irradiated with UV radiation to yield a pressure sensitive adhesive construction having high cohesive strength at room and elevated temperatures and, more particularly, a 70° C. shear resistance of at least 20 hours, as measured by a static shear test (described below). A variety of UV light sources are known, including low, high, and medium pressure mercury lamps, which emit over a wide range of wavelengths. Most pigmented and unpigmented adhesives can be readily cured using a medium-pressure mercury lamp, which has emission bands ranging from about 240 to about 410 nanometers. Alternatively, UV sources that emit over a more narrow range of wavelengths can be used if desired, so long as the emission spectrum of the source overlaps with the absorption spectrum of the photoinitiator employed within the adhesive. Where the adhesive is pigmented with titanium dioxide or similar pigments, the preferred hydrogen-abstracting photoinitiator has absorption bands in the near UV region, and a UV source that emits at least in that region is employed.

Good results have been obtained using two conventional medium pressure mercury lamps having spectral emissions from about 240 to about 410 nanometers, and light intensities of from about 5 to 10 kWatts/m$^2$. The coated substrate is carried on a moving web under the UV radiation source, where the web temperature may range from 45° C. to 125° C. The dosage of UV radiation received by the coated adhesive film is easily controlled by adjusting the UV lamp intensity and/or the web speed.

Unlike other UV cured acrylic-based adhesives, adhesives prepared in accordance with the present invention are conveniently cured in an aerobic atmosphere, without the need for inerting.

After the adhesive coated substrate is cured, it can be laminated with a sheet of release liner for protection.

EXAMPLES 1–6

The following examples are illustrative of the present invention. In each case, except where otherwise indicated, an acrylic-based copolymer was synthesized, compounded with various ingredients, applied to a substrate, and irradiated with UV radiation. The adhesive was then evaluated for tack, peel, and shear.

More particularly, the acrylic-based copolymer was prepared as follows: Into a 1,000 to 1,500 ml jacketed resin kettle equipped with a strong mechanical stirrer, thermocouple, water-cooled condenser, and nitrogen inlet valve, was charged 5% of a mixture of the monomers to be polymerized, along with (in most cases) a polymerization initiator and molecular weight regulator. After 5% of the mixture was charged into the reactor, polymerization was initiated. Heating was provided through the jacket by a circulating oil bath. After the reaction of the initial monomer charge had subsided somewhat, the remainder of the monomer mixture was added to the reactor through a metering pump over a period of 1 to 3 hours, while maintaining the reaction temperature within the range of 60 to 100° C., depending on the half-life temperature of the initiator(s) used. After all of the monomer mixture had been added to the reactor, the reaction mixture was allowed to cook-off for another hour at a temperature about 10° C. higher than the polymerization temperature, with the addition of a small quantity (approximately 0.05%) of polymerization initiator during this period.

In those examples where dioctylfumurate was used as one of the comonomers, it was placed in the reactor at the beginning of the reaction run. The dioctylfumurate was then heated to the polymerization reaction temperature, and the other monomers and ingredients were gradually added through a metering pump. Dioctylfumurate is a slow reacting monomer that does not readily homopolymerize.

After reaction, the copolymer was sampled for percent conversion, and its melt viscosity was measured. The copolymer was then blended with other compounding ingredients (e.g., photoinitiator, tackifier, multifunctional acrylate, etc.) using a sigma blade mixer or similar mixing equipment. Blending was continued until the compounded copolymer was essentially homogenous.

The compounded copolymer was direct coated on a 2.0 mil polyester film substrate at a coat weight of 30±2 g/m$^2$, and cured by UV radiation using two conventional medium pressure mercury lamps having spectral emissions between 240 and 410 nanometers and light intensities of from about 5 to about 10 kWatts/m$^2$. The coated polyester film was carried on a moving web under the UV light source, where the web temperature ranged from about 45 to about 125° C. UV cure was conducted in the presence of air.

Adhesive performance of the samples was evaluated using a PSTC-1 180° peel adhesion test and a PSTC-7 static shear test.

In the 180° peel adhesion test, samples of the coated, irradiated, adhesive construction were cut into 1"×8" test strips, which were rolled down on standard stainless steel test panels with a 4.5 lb. rubber clad steel roller, back and forth once, at a rate of 12" per minute. After a dwell time of 20 minutes at standard testing laboratory conditions, the test strips were peeled away from the test panel in an Instron tensile tester at 180° to the test panel, i.e., parallel to the surface of the panel, at a rate of 12" per minute. The force to remove the adhesive test strip from the test panel was measured in N/m. All tests were conducted in triplicate. Possible adhesion failure modes were: "panel failure"—the adhesive construction detached from the panel cleanly, without leaving a residue; "panel staining"—the adhesive construction detached cleanly, but left a faint stain or "shadow" on the panel; "cohesive failure"—the adhesive construction split apart, leaving adhesive residue on the test panel and the facestock; "facestock failure"—the adhesive completely detached from the facestock, and transferred to the test panel; and "mixed"—mixed failure modes were evident.

In static shear testing, the samples were cut into 0.5"×2" and 1"×2.5" test strips. When the shear test was conducted at room temperature, the 0.5"×2" test strips were applied on a standard stainless steel test panel making a sample overlap of 0.5"×0.5" with the test panel. The sample portion on the test panel was rolled down with a 4.5 lb. rubber clad steel roller, back and forth once, at a rate of 12" per minute. The free end of the test strip was folded back on itself, and a small hole was made at that end, where a load of 500 grams could be attached during the test. The free end of the strip was optionally reinforced with aluminum foil, cardboard, etc., to prevent the sample from tearing when the load was applied. After a dwell time of at least 20 minutes under standard laboratory testing conditions, the test panels with the test strips on them were placed on a rack in a vertical position, and a load of 500 grams was attached to the hole in the test strips' free end. The time in minutes for the sample to fail and fall off the panel was measured by a timer. The modes of adhesive failure were recorded using the same adhesion failure modes described above. All tests were conducted in triplicate. When the shear test was conducted at an elevated temperature, i.e., 70° C., 100° C., or higher, the 1"×2.5" test strips were utilized, and applied on the test panels to make a sample overlap of 1"×1" with the test panel. The rack with panels, test strips, 500 gram load and timing device were placed in an oven, which was equipped with a constant temperature control mechanism. Static shear testing at elevated temperatures is more severe on the adhesive than testing at room temperature.

All samples which showed neither cohesive failure nor creeping of the test strip down the test panel surface after 1200 minutes (20 hours), were considered to pass the static shear test. (In general, if the sample did not fail within 20 hours of the start of the static shear test, at a given temperature, it would not fail thereafter.)

Example 1

A copolymer consisting of 64.7% by weight of 2-ethylhexyl acrylate, 2.3% of DMAPMA, 16.5% of N-vinyl-pyrrolidone and 16.5% of dioctyl fumurate was prepared in a bulk polymerization, using 0.4 pph of VAZO 67 as the polymerization initiator and 0.3 pph of n-dodecylmercaptan as the molecular weight regulator. The resulting polymer had a 100° C. melt viscosity of 40.6 Pa.s., as measured in a Brookfield Thermocel with a #29 spindle at 10 rpm, and a solids content of 99.6%, as determined by vacuum oven drying. The copolymer was compounded with 23.5 pph of Regalrez 6108 tackifying resin (from Hercules), after which the melt viscosity was again measured and determined to be about 37.5 Pa.s. The resin compounded polymer was then further compounded with 3 pph of QUANTACURE BMS and 4 pph of diethylene glycol diacrylate, direct coated on a 2 mil PET substrate at a coat weight of 30 g/m$^2$, and irradiated with 5±1 kJ/m$^2$ of UV radiation. The cured, unpigmented adhesive passed the static shear test at 70° C. on stainless steel panels, without failure or creep. Without UV radiation, an identical adhesive failed the shear test immediately; that is, the test strip dropped after only a minute or less. The 180° peel adhesion of the UV-cured adhesive on stainless steel and on smooth polypropylene surfaces was 600 N/m.

Example 2

A copolymer similar to the one described in Example 1 was prepared, with the exception that the Regalrez tackifying resin was present in the copolymerization reactor vessel from the start of the polymer synthesis; 0.3 pph of VAZO 64 initiator was used, and no molecular weight regulator was used. The resulting polymer had a 100° C. melt viscosity of 146.0 Pa.s. and a solids content of 98.5%. The copolymer was compounded with 3 pph of Lucirin TPO, 10 pph of Photomer 8149 (a diacrylate from the Henkel Corporation) and 10 pph of Rutile R-900 titanium dioxide pigment (from DuPont Chemical Co.), direct coated on a 2 mil PET substrate at a coat weight of 30 g/m$^2$, and irradiated to a high cohesive strength with 5±1 kJ/m$^2$ of UV radiation. The cured, pigmented adhesive passed the static shear test at 70° C., without failure or creep. Without UV radiation, an identical pigmented adhesive failed the shear test immediately. The 180° peel adhesion of the UV cured adhesive on stainless steel panels was around 800N/m.

Example 3

A copolymer consisting of 52.4% of 2-ethylhexyl acrylate, 2% of DMAPMA, 13.3% of N-vinylpyrrolidone and 13.3% of dioctyl fumurate was prepared in a bulk polymerization, in the presence of 19.0% of Regalfez 6108 resin, using 0.4 pph of VAZO 67 as the polymerization initiator and 0.1 pph of n-dodecylmercaptan as the molecular weight regulator. The resulting polymer had a 100° C. melt viscosity of 41.0 Pa.s. and a solids content of 99.0%. The polymer was compounded with 4 pph of 1,6-hexanediol diacrylate, 2 pph of pentaerythritol tetraacrylate, 2 pph of Lucirin TPO, and 10 pph of Rutils R-900 titanium dioxide. The compounded adhesive was coated on a 2 mil PET substrate at a coat weight of 30 g/m$^2$, and irradiated with UV light at a dosage of 5±1 kJ/m$^2$. The cured, pigmented, pressure sensitive adhesive had a 180° peel of 650 N/m off stainless steel panels, and passed the static shear test at 70° without failure or creep.

Example 4

A copolymer consisting of 62.5% of 2-ethylhexyl acrylate, 3.75% of DMAPMA, 12.5% of N-vinylpyrrolidone and 21.25% of dioctyl fumurate was prepared in a bulk polymerization, using 0.4 pph of VAZO 67 as the polymerization initiator and 0.14 pph of n-dodecylmercaptan as the molecular weight regulator. The resulting polymer had a 100° C. melt viscosity of 47.2 Pa.s. and a solids content of 99.1%. The polymer was compounded with 25 pph of Regalrez 6108 resin, 6 pph of 1,6-hexanediol diacrylate, 2.5 pph of Lucirin TPO, and 12 pph of Rutile R-900 titanium dioxide. The compounded adhesive was coated on a 2 mil PET substrate at a coat weight of 30 g/m², and irradiated with UV light at 5±1 kJ/m². The irradiated adhesive exhibited a 180° peel of 520 N/m off stainless steel panels, and passed the static shear test at 70° C. without failure or creep.

Example 5

A polymer blend was prepared by making two compositionally identical copolymers, blending them together, and compounding them with various ingredients. Each copolymer consisted of 62.5% of 2-ethylhexyl acrylate, 3.75% of DMAPMA, 12.5% of N-vinylpyrrolidone and 21.25% of dioctyl fumurate, and each copolymer was prepared in bulk polymerization, using 0.4 pph of VAZO 67 as the polymerization initiator and 0.23 pph of n-dodecylmercaptan as the molecular weight regulator. The resulting two polymers had 100° C. melt viscosities of 38.7 and 42.0 Pa.s., respectively, and a solids content of 99.1%. The polymers were blended together, and the blend was compounded with 25 pph of Regalrez 6108 resin, 6 pph of 1,6-hexanediol diacrylate, 2.5 pph of Lucirin TPO, 12 pph of Rutile R-900 titanium dioxide, 0.2 pph of Irganox 565, and 0.2 pph of Irganox 1010. The latter two components are heat stabilizers from the Ciba Company. The compounded adhesive was coated on a 2 mil PET substrate at a coat weight of 30 g/m², and irradiated with UV light at a dosage of 5±1 kJ/m². The resulting pressure sensitive adhesive had a 180° peel of 440 N/m off stainless steel panels, and passed the static shear test at 70° C. without failure or creep.

In order to evaluate the thermal stability of the PSA polymers of the current invention, a portion of the compounded polymer described in Example 5 was kept continuously at 100° C. for 14 days, after which its melt viscosity was measured using a Brookfield Thermocel with #29 spindle at 10 rpm. After 14 days, the melt was still flowable and had not gelled, and no graininess was observed in the melt. In another experiment, the compounded polymer of Example 5 was kept at 110° C. for 13 days, after which it was observed that the melt was still flowable and had not gelled. As a result of these tests, it is apparent that the PSA polymers of the current invention are highly heat stable, even when compounded with UV curing ingredients. Consequently, the compounded polymers can be used in various coating and printing equipment with little risk of plugging up or jamming the equipment.

Example 6

A copolymer consisting of 50% of 2-ethylhexyl acrylate, 4% of DMAPMA, 12% of N-vinylpyrrolidone, 14% of dioctyl fumurate, and 20% of isobornylacrylate was prepared in a bulk polymerization, using 0.4 pph of VAZO 67 as the polymerization initiator and 0.3 pph of n-dodecylmercaptan as the molecular weight regulator. The resulting polymer had a 100° C. melt viscosity of 75.5 Pa.s. and a solids content of 97.9%. The polymer was compounded with 5 pph of 1,6-hexanediol diacrylate, 2 pph of pentaerythritol triacrylate, 2.5 pph of Lucirin TPO, and 12.6 pph of Rutile R-900 titanium dioxide. No tackifier was added. The compounded adhesive was separately coated on two 2 mil PET substrates at a coat weight of 30 g/m². One coated substrate was irradiated with UV radiation at a dosage of 4 kJ/m², and the other was irradiated with a dosage of 6 kJ/m². The resulting irradiated PSA's exhibited 180° peel off stainless steel panels of 720 N/m and 580 N/m, respectively, and passed the static shear test at 70° C. without failure or creep.

COMPARATIVE EXAMPLES A–D

The following examples illustrate the inferior performance of a commercially available pressure sensitive adhesive to which titanium dioxide was added and which was irradiated with UV light, and adhesive compositions prepared in accordance with the formulation scheme discussed above, but lacking a tertiary amine-containing monomer in the acrylic-based copolymer. Adhesive performance was evaluated using the tests and conditions described above.

Comparative Example A 81.8% by weight of Acronal DS 3429S, an acrylic-based, clear (unpigmented) PSA sold by BASF, was compounded with 11.1% of Rutile R-900 titanium dioxide, 7.1% of Sylvatac 1100 tackifying resin (a rosin-based tackifier from the Arizona Chemical Company), and 3.6 pph of pentaerythritol tetraacrylate. The compounded adhesive was coated on a 2 mil PET film at a 28 g/m² coat weight and irradiated with UV light from two medium pressure mercury lamps, at a dosage of 5 kJ/m². The irradiated adhesive exhibited a 70° C. shear from stainless steel panels of only one minute. The failure mode was cohesive failure.

Although marketing literature describes Acronal DS 3429S as being UV-curable, the above experiment demonstrates that, when compounded with titanium dioxide, the adhesive fails to cure to a high cohesive strength, unlike adhesives prepared in accordance with the present invention.

Comparative Example B

A copolymer consisting of 67.9% of 2-ethylhexylacrylate, 11.9% of N-vinylpyrrolidone, and 22.2% of dioctyl fumurate was prepared in a bulk polymerization, using 0.4 pph of VAZO 67 as the polymerization initiator and 0.23 pph of n-dodecylmercaptan as the molecular weight regulator. No tertiary amine-containing monomer was included in the mixture. The resulting polymer had a 100° C. melt viscosity of 35.0 Pa.s. and a solids content of 99.0%. The polymer was compounded with 23.8 pph of Regalfez 6108 resin, 4 pph of diethyleneglycol diacrylate, 2 pph of dimethylethanolamine, and 3 pph of QUANTACURE BMS. The adhesive was coated on a 2 mil PET substrate at a coat weight of 30 g/m², and irradiated with UV light at a dosage of 5 kJ/m². The resulting PSA showed a 70° C. shear of about 10 minutes. The mode of failure was cohesive failure. Without UV radiation, the same adhesive formulation failed the 70° C. shear test immediately.

This example illustrates the importance of incorporating the tertiary amine functionality into the polymer backbone during synthesis of the adhesive copolymer. In the absence of such incorporation, the copolymer, even when compounded with a tertiary amine, does not exhibit high cohesive strength or high temperature shear resistance, even after UV irradiation.

Comparative Example C

A copolymer consisting of 67.0% of 2-ethylhexyl acrylate, 16.5% of N-vinylpyrrolidone and 16.5% of dioctyl fumurate was prepared in a bulk polymerization, using 0.4 pph of VAZO 67 as the polymerization initiator and 0.03 pph of n-dodecylmercaptan as the molecular weight regulator. The resulting polymer had a 100° C. melt viscosity of 75.0

Pa.s. and a solids content of 98.5%. The polymer was compounded with 17.6 pph of Regalfez 6108 resin, 11.8 pph of Photomer 8149, 2.4 pph of dimethylethanol-amine, 3.5 pph of Lucirin TPO, and 11.8 pph of Rutile R-900 titanium dioxide. The compounded adhesive was coated on a 2 mil PET substrate at a coat weight of 30 g/m$^2$, and irradiated with UV light at a dosage of 5 kJ/m$^2$. The irradiated adhesive exhibited a 70° C. shear of about 2 minutes. Even when the irradiation dosage was increased to 9 kJ/m$^2$, the adhesive exhibited a 70° C. shear of only about half an hour. In both cases the modes of failure were cohesive failure. Without UV radiation, the adhesive failed the 70° C. shear test immediately.

Comparative Example D

A copolymer consisting of 52.4% of 2-ethylhexyl acrylate, 2% of N-tert-butylacrylamide, 13.3% of N-vinylpyrrolidone, and 13.3% of dioctyl fumurate was prepared in a bulk polymerization in the presence of 19.0% of Regalrez 6108 resin, using 0.3 pph of VAZO 64 as the polymerization initiator, and no molecular weight regulator. The resulting polymer had a 100° C. melt viscosity of 68.0 Pa.s. and a solids content of 96.9%. The polymer was compounded with 10 pph of Photomer 8149, 3 pph of Lucirin TPO and 10 pph of Rutile R-900 titanium dioxide. The compounded adhesive was coated on a 2 mil PET substrate at a coat weight of 30 g/m$^2$, and irradiated with UV light at a dosage of 5 kJ/m$^2$. The irradiated PSA exhibited a 100° C. peel of 980 N/m of stainless steel panels, and a 70° C. shear of two minutes. The mode of failure for both the peel and shear tests was cohesive failure.

This example illustrates that the amide function by itself, even when bonded to the polymer backbone, is less effective in bringing about crosslinking by UV irradiation than are tertiary amine-containing monomers such as DMAPMA.

The present invention has been described with reference to various examples and preferred embodiments, but is not limited thereto. Workers skilled in the art and technology to which this invention pertains will appreciate that alterations and changes in the described compositions and methods can be made without meaningfully departing from the principal, spirit and scope of this invention. Accordingly, the foregoing description should not be read as pertaining only to the precise examples described herein but, rather, should be read consistent with and as support for the following claims, which are to have their fullest, fair scope.

What is claimed is:

1. A crosslinked, pigmented, pressure sensitive adhesive construction, comprising:
   a compounded copolymer coated on a substrate and UV cured to a 70° C. shear resistance of at least about 20 hours, said compounded copolymer comprising a pigment, a hydrogen-abstracting photoinitiator, and an acrylic-based copolymer, said copolymer being prepared from a substantially acid-free monomer mixture comprising, based on the total weight of monomers:
   (i) from about 30 to about 99.99% by weight of at least one alkyl acrylate, the alkyl group of which has from 1 to about 24 carbon atoms;
   (ii) from about 0.01 to about 15% by weight of a tertiary amine-containing monomer;
   (iii) from 0 to about 25% by weight of at least one polar vinylic monomer and
   (iv) from 0 to about 30% by weight of at least one diester of an ethylenically unsaturated dicarboxylic acid.

2. A pressure sensitive adhesive construction as recited in claim 1, wherein the alkyl group of said at least one alkyl acrylate has from 1 to about 12 carbon atoms.

3. A pressure sensitive adhesive construction as recited in claim 1, wherein the alkyl group of said at least one alkyl acrylate has from about 4 to about 8 carbon atoms.

4. A pressure sensitive construction as recited in claim 1, wherein said at least one alkyl acrylate is selected from the group consisting of methyl acrylate, ethyl acrylate, n-propyl acrylate, isopropyl acrylate, n-butyl acrylate, isobutyl acrylate, n-amyl acrylate, iso-amyl acrylate, n-hexyl acrylate, isohexyl acrylate, cyclohexyl acrylate, isooctyl acrylate, 2-ethylhexy acrylate, decyl acrylate, lauryl acrylate, stearyl acrylate, isobornyl acrylate, and mixtures thereof.

5. A pressure sensitive adhesive construction as recited in claim 1, wherein said at least one alkyl acrylate comprises 2-ethylhexyl acrylate.

6. A pressure sensitive adhesive construction as recited in claim 1, wherein said at least one alkyl acrylate is present in an amount of from about 50 to about 70% by weight, based on the total weight of monomers.

7. A pressure sensitive adhesive construction as recited in claim 1, wherein the monomer mixture further comprises an alkyl methacrylate, the alkyl group of which has from one to about 24 carbon atoms, with the alkyl acrylate and alkyl methacrylate monomers present in a combined amount of from about 30 to about 99.99% by weight, based on the total weight of monomers.

8. A pressure sensitive adhesive construction as recited in claim 7, wherein the alkyl group of said alkyl methacrylate has from 1 to about 12 carbon atoms.

9. A pressure sensitive adhesive construction as recited in claim 1, wherein the tertiary amine-containing monomer is selected from the group consisting of acrylic, methacrylic, acrylamide, methacrylamide, styrenic and vinylic monomers containing at least one tertiary amine functional group.

10. A pressure sensitive adhesive construction as recited in claim 1, wherein the tertiary amine-containing monomer is N,N-dimethylaminopropyl methacrylamide.

11. A pressure sensitive adhesive construction as recited in claim 1, wherein the tertiary amine-containing monomer is selected from the group consisting of N,N-dimethylaminopropyl methacrylamide, N,N-diethylaminopropyl methacrylamide, N,N-dimethylaminoethyl acrylate, N,N-diethylaminoethyl acrylate, N,N-dimethylaminopropyl acrylate, N,N-diethylaminopropyl acrylate, N,N-dimethylaminoethyl methacrylate, N,N-dimethylaminoethyl acrylamide, N,N-dimethylaminoethyl methacrylamide, N,N-diethylaminoethyl acrylamide, N,N-diethylaminoethyl methacrylamide, 4-(N,N-dimethylamino)-styrene, 4-(N,N-diethylamino)-styrene, N,N-dimethylaminoethyl vinyl ether, and N,N-diethylaminoethyl vinyl ether.

12. A pressure sensitive adhesive construction as recited in claim 1, wherein the tertiary amine-containing monomer is present in an amount of from about 1 to about 6% by weight based on the total weight of monomers.

13. A pressure sensitive adhesive construction as recited in claim 1, wherein the at least one polar vinylic monomer is selected from the group consisting of N-vinylpyrrolidone, acrylamides, methacrylamides, acrylonitrile, methacrylonitrile, etheracrylates, ethermethacrylates, hydroxyalkyl acrylates, hydroxyalkyl methacrylates, glycidyl acrylates, glycidyl methacrylates, and mixtures thereof.

14. A pressure sensitive adhesive construction as recited in claim 1, wherein the at least one polar vinylic monomer is N-vinylpyrrolidone.

15. A pressure sensitive construction as recited in claim 1, wherein the at least one polar vinylic monomer is present in an amount of from about 15 to 20% by weight, based on the total weight of monomers.

16. A pressure sensitive adhesive construction as recited in claim 1, wherein the at least one diester of an ethylenically unsaturated dicarboxylic acid is selected from the group consisting of dioctyl fumarate, dibutyl fumarate, dioctyl maleate, and mixtures thereof.

17. A pressure sensitive adhesive construction as recited in claim 1, wherein the at least one diester of an ethylenically unsaturated dicarboxylic acid is present in an amount of from about 15 to about 25% by weight based on the total weight of monomers.

18. A pressure sensitive adhesive construction as recited in claim 1, wherein the pigment comprises titanium dioxide.

19. A pressure sensitive adhesive construction as recited in claim 18, wherein the titanium dioxide is selected from the group consisting of anatase, rutile and mixtures thereof.

20. A pressure sensitive adhesive construction as recited in claim 1, wherein the photoinitiator is a redshifted benzophenone compound.

21. A pressure sensitive adhesive construction as recited in claim 20, wherein the red-shifted benzophenone compound is 4-benzoyl-4'-methyldiphenyl sulfide.

22. A pressure sensitive adhesive construction as recited in claim 1, wherein the photoinitiator is an acylphosphine oxide.

23. A pressures sensitive adhesive construction as recited in claim 22, wherein the acylphosphine oxide is 2,4,6-trimethylbenzoyldiphenylphosphine oxide.

24. A pressure sensitive adhesive construction as recited in claim 22, wherein the acylphosphine oxide is bis[2,6-dimethoxybenzoyl]-2,4,4,-trimethylpentylphosphine oxide.

25. A pressure sensitive adhesive construction as recited in claim 1, wherein the photoinitiator is a thioxanthone derivative.

26. A pressure sensitive adhesive construction as recited in claim 25, wherein the thioxanthone derivative is isopropylthioxanthone.

27. A pressure sensitive adhesive construction as recited in claim 25, wherein the thioxanthone derivative is a mixture of 2-isopropylthioxanthone and 4-isopropylthioxanthone.

28. A pressure sensitive adhesive construction as recited in claim 1, wherein the hydrogen-abstracting photoinitiator absorbs in the near UV region of the electromagnetic spectrum.

29. A pressure sensitive adhesive construction as recited in claim 1, further comprising a tackifier.

30. A pressure sensitive adhesive construction as recited in claim 29, wherein the tackifier is selected from the group consisting of hydrocarbon resins, rosin ester resins and mixtures thereof.

31. A pressure sensitive adhesive construction as recited in claim 29, wherein the tackifier is present in an amount of up to about 45 parts per hundred parts of copolymer.

32. A pressure sensitive adhesive construction as recited in claim 1, further comprising a multifunctional acrylate or methacrylate.

33. A pressure sensitive adhesive construction as recited in claim 32, wherein the multifunctional acrylate is selected from the group consisting of diethylene glycol diacrylate, triethylene glycol diacrylate, tripropylene glycol diacrylate, 1,6-hexanediol diacrylate, trimethylolpropane triacrylate, trimethylolpropane trimethacrylate, pentaerythritoltriacrylate and mixtures thereof.

34. A pressure sensitive adhesive construction as recited in claim 32, wherein the multifunctional acrylate or methacrylate is present in an amount of up to about 15 parts per hundred parts of copolymer.

35. A pressure sensitive adhesive construction as recited in claim 1, further comprising a tackifier and a multifunctional acrylate or methacrylate.

36. A method for making a crosslinked, pigmented pressure sensitive adhesive construction, comprising:
  (a) preparing an acrylic-based copolymer by polymerizing a substantially acid-free monomer mixture comprising, based on the total weight of monomers:
    (i) from about 30 to about 99.99% by weight of at least one alkyl acrylate, the alkyl group of which has from 1 to about 24 carbon atoms;
    (ii) from about 0.01 to about 15% by weight of a tertiary amine-containing monomer;
    (iii) from 0 to about 25% by weight of at least one polar vinylic monomer; and
    (iv) from 0 to about 30% by weight of at least one diester of an ethylenically unsaturated dicarboxylic acid;
  (b) compounding the copolymer with a pigment and a hydrogen-abstracting photoinitiator;
  (c) applying the compounded copolymer to a substrate; and
  (d) irradiating the compounded copolymer with UV radiation to yield a cured, pressure sensitive adhesive construction having a 70° C. shear resistance of at least about 20 hours.

37. A method for making a pigmented, crosslinked, pressure sensitive adhesive construction, comprising:
  (a) applying a compounded copolymer to a substrate, said compounded copolymer comprising a pigment, a hydrogen-abstracting photoinitiator, and a copolymer prepared by polymerizing a substantially acid-free monomer mixture comprising, based on the total weight of monomers:
    (i) from about 30 to about 99.99% by weight of at least on alkyl acrylate;
    (ii) from about 0.01 to about 15% by weight of a tertiary amine-containing monomer;
    (iii) from 0 to about 25% by weight of at least one polar vinylic monomer; and
    (iv) from 0 to about 30% by weight of at least on diester of an ethylenically unsaturated dicarboxylic acid; and
  (b) irradiating the compounded copolymer with UV radiation to form an adhesive construction having a 70° C. shear resistance of at least about 20 hours.

38. A crosslinked, pressure sensitive adhesive construction, comprising:
  a compounded copolymer coated on a substrate and UV-cured to a 70° C. shear resistance of at least about 20 hours, said compounded copolymer comprising a hydrogen-abstracting photoinitiator selected from the group consisting of acetophenone, benzophenone, benzil, quinone, and thioxanthone, said copolymer being prepared from a substantially acid-free monomer mixture comprising, based on the total weight of monomers:
    (i) from about 30 to about 99.99% by weight of at least one alkyl acrylate, the alkyl group of which has from 1 to about 24 carbon atoms;
    (ii) from about 0.01 to about 15% by weight of a tertiary amine-containing monomer;
    (iii) from 0 to about 25% by weight of at least one polar vinylic monomer and (iv) from 0 to about 30% by weight of at least one diester of an ethylenically unsaturated dicarboxylic acid.

39. A pressure sensitive adhesive comprising:

an acrylic copolymer compounded with a hydrogen-abstracting photoinitiator and a pigment, said copolymer being prepared from a substantially acid-free monomer mixture comprising, based on the total weight of monomers, (i) from about 30 to about 99.99% by weight of at least one alkyl acrylate, the alkyl group of which has from 1 to about 24 carbon atoms, and (ii) from about 0.01 to about 15% by weight of at least one tertiary amine-containing monomer;

wherein, when coated on a substrate and irradiated with UV light, the compounded copolymer cures to a 70° C. shear of at least 20 hours.

40. A pressure sensitive adhesive as recited in claim 39, wherein the monomer mixture further comprises up to about 25% by weight of at least one polar vinylic monomer.

41. A pressure sensitive adhesive as recited in claim 39, wherein the monomer mixture further comprises up to about 30% by weight of at least one diester of an ethylenically unsaturated dicarboxylic acid.

42. A pressure sensitive adhesive as recited in claim 39, wherein the monomer mixture further comprises an alkyl methacrylate, the alkyl group of which has from 1 to about 24 atoms, with the alkyl acrylate and alkyl methacrylate monomers present in a combined amount of from about 30 to about 99.99% by weight, based on the total weight of monomers.

43. A pressure sensitive adhesive, comprising:

an acrylic copolymer compounded with a hydrogen-abstracting photoinitiator, said copolymer being prepared from a substantially acid-free monomer mixture comprising, based on the total weight of monomers, (i) from about 30 to about 99.99% by weight of at least one alkyl acrylate, the alkyl group of which has from 1 to about 24 carbon atoms, (ii) from about 0.01 to about 15% by weight of at least one tertiary amine-containing monomer, (iii) up to about 25% by weight of a least one polar vinylic monomer, and (iv) up to abut 30% by weight of at least one diester of an ethylenically unsaturated dicarboxylic acid;

wherein, when coated on a substrate and irradiated with UV light, the compounded copolymer cures to a 70° C. shear of least about 20 hours.

44. A pressure sensitive adhesive as recited in claim 43, wherein the copolymer is further compounded with a pigment.

* * * * *

UNITED STATES PATENT AND TRADEMARK OFFICE
CERTIFICATE OF CORRECTION

PATENT NO. : 5,686,504
DATED : November 11, 1997
INVENTOR(S) : T. Liem Ang

It is certified that error appears in the above-indentified patent and that said Letters Patent is hereby corrected as shown below:

Column 4, line 67, replace "including" with -- even --.
Column 11, line 40, replace "thecompound copolymer" with
 -- the compounded copolymer --.
Column 12, line 63, replace "namometers" with -- nanometers --.
Column 14, line 39, replace "800N/m" with -- 800 N/m --.
Column 14, line 45, replace "Regalfez" with -- Regalrez --.
Column 16, line 44, replace "Regalfez" with -- Regalrez --.
Column 17, line 2, replace "Regalfez" with -- Regalrez --.
Column 17, line 30, replace "of" (2nd occurrence) with --off--.
Column 20, line 38, replace "on alkyl acrylate" with -- one alkyl acrylate --.
Column 20, line 44, replace "on diester" with -- one diester --.
Column 22, line 14, replace "of a least" with -- of at least --.

Signed and Sealed this

Twenty-ninth Day of September, 1998

Attest:

BRUCE LEHMAN

Attesting Officer

Commissioner of Patents and Trademarks